(12) United States Patent
Kotato et al.

(10) Patent No.: US 7,083,878 B2
(45) Date of Patent: Aug. 1, 2006

(54) NONAQUEOUS ELECTROLYTIC SOLUTION AND LITHIUM SECONDARY BATTERY

(75) Inventors: Minoru Kotato, Ibaraki (JP); Shinichi Kinoshita, Ibaraki (JP); Kunihisa Shima, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/026,398

(22) Filed: Jan. 3, 2005

(65) Prior Publication Data

US 2005/0164094 A1    Jul. 28, 2005

Related U.S. Application Data

(63) Continuation of application No. PCT/JP04/02182, filed on Feb. 25, 2004.

(30) Foreign Application Priority Data

Feb. 27, 2003  (JP)  ............... 2003-051684
May 13, 2003  (JP)  ............... 2003-134694
Jun. 19, 2003  (JP)  ............... 2003-174756

(51) Int. Cl.
*H01M 6/16*    (2006.01)

(52) U.S. Cl. ............ 429/338; 429/324; 429/326; 429/342; 429/231.9; 429/231.95; 252/62.2

(58) Field of Classification Search ............ 252/62.2; 429/324, 326, 338, 342
See application file for complete search history.

(56) References Cited

U.S. PATENT DOCUMENTS 6,114,070 A * 9/2000 Yoshida et al. ............ 429/332

6,664,008 B1    12/2003 Suzuki et al.
2003/0165733 A1    9/2003 Takehara et al.
2004/0101763 A1    5/2004 Kotato et al.

FOREIGN PATENT DOCUMENTS

| JP | 8-7922 | 1/1996 |
|---|---|---|
| JP | 8-64237 | 3/1996 |
| JP | 11-512563 | 3/1997 |
| JP | 10-21960 | 1/1998 |
| JP | 11-86907 | 3/1999 |
| JP | 11-185806 | 7/1999 |
| JP | 2000-277146 | 10/2000 |
| JP | 2001-148258 | 5/2001 |
| JP | 2002-175834 | 6/2002 |
| JP | 2002-260725 | 9/2002 |
| JP | 2002-298910 | 10/2002 |
| WO | WO 97/11504 | 3/1997 |

* cited by examiner

*Primary Examiner*—Bruce F. Bell
(74) *Attorney, Agent, or Firm*—Oblon, Spivak, McClelland, Maier & Neustadt, P.C.

(57) ABSTRACT

An object of the invention is to provide such a battery that has a high capacity, is excellent in storage characteristics, cycle characteristics and continuous charging characteristics, and is small in gas generation amount, whereby size reduction and improvement in performance of a lithium secondary battery can be attained.

The present invention relates to a nonaqueous electrolytic solution comprising a lithium salt and a nonaqueous solvent dissolving the same, wherein the electrolytic solution contains, as the lithium salt, $LiPF_6$ in a concentration of from 0.2 to 2 mole/L, and $LiBF_4$ and/or a compound represented by the following formula (1) in a molar ratio of from 0.005 to 0.4 with respect to $LiPF_6$, and the nonaqueous solvent mainly comprises (1) ethylene carbonate and/or propylene carbonate, (2-1) a symmetric linear carbonate, (2-2) an asymmetric linear carbonate, and (3) vinylene carbonate.

16 Claims, 1 Drawing Sheet

US 7,083,878 B2

NONAQUEOUS ELECTROLYTIC SOLUTION AND LITHIUM SECONDARY BATTERY

CROSS-REFERENCE TO A RELATED APPLICATION

The present application is a continuation of International Application PCT/JP04/02182 filed on Feb. 25, 2004, which claims priority to Japanese Patent Application Nos. 2003-051684, filed Feb. 27, 2003; 2003-134694 filed May 13, 2003; 2003-174756, filed Jun. 19. 2003.

FIELD OF THE INVENTION

The present invention relates to a nonaqueous electrolytic solution and a lithium secondary battery using the same. More particularly, it relates to such a lithium secondary battery that has a high capacity, and is excellent in storage characteristics, cycle characteristics and continuous charge characteristics, with generation of a small amount of gas.

BACKGROUND ART

Along with weight reduction and size reduction of electric appliances in recent years, a lithium secondary battery having a high energy density is being developed.

An electrolyte solution used in a lithium secondary battery is generally constituted mainly by a lithium salt and a nonaqueous solvent. Examples of the main component of the nonaqueous solvent include a cyclic carbonate, such as ethylene carbonate and propylene carbonate; a linear carbonate, such as dimethyl carbonate and ethylmethyl carbonate; and a cyclic carboxylic acid ester, such as γ-butyrolactone and γ-valerolactone.

In order to improve the characteristics of the secondary battery, such as load characteristics, cycle characteristics, storage characteristics and low temperature characteristics, various investigations have been made for the nonaqueous solvent and the lithium salt.

For example, Patent Document 1 discloses that upon using a mixture of an asymmetric linear carbonate and a cyclic carbonate having a double bond as the nonaqueous solvent, the cyclic carbonate having a double bond is predominantly reacted with a negative electrode to form a film with good quality on the surface of the negative electrode, and thereby a nonconductor film on the surface of the negative electrode due to the asymmetric linear carbonate is prevented from being formed to improve the cycle characteristics.

In a secondary battery using an electrolytic solution containing only $LiPF_6$ as the lithium salt, $PF_5$ formed through dissociation of $LiPF_6$ ($LiPF_6 \rightarrow Li^+ + PF_6^- \rightarrow Li^+ + F^- + PF_5$) breaks the C—O bond of the carbonate to decompose the carbonate (self-discharge), whereby the battery capacity is lowered upon storing. Patent Document 2 discloses, however, that in a secondary battery using an electrolytic solution containing both $LiPF_6$ and $LiBF_4$, an anion ($BF_4^-$) formed from $LiBF_4$ suppresses the decomposition of $PF_6^-$ formed from $LiPF_6$ to stabilize the electrolytic solution, whereby the battery capacity can be prevented from being lowered upon storing. Patent Document 2 discloses the use of a mixture of a cyclic carbonate and a linear carbonate as the nonaqueous solvent, and a mixture of ethylene carbonate and diethyl carbonate is used in the examples thereof.

Patent Document 3 discloses that in a lithium secondary battery using aluminum as a current collector, a high ionic conductivity can be ensured, and aluminum can be prevented from being corroded, by using an electrolytic solution containing a cyclic perfluoroalkylene disulfonylimide salt as the lithium salt. Patent Document 3 also discloses that the cyclic imide salt can be used in combination with other lithium salts, such as LiBF4 and $LiPF_6$, and is preferably used in a proportion of 10 times by mole the other lithium salts.

However, demands for high performance of a lithium secondary battery are being increased in recent years, and such a lithium secondary battery is being demanded that has a high capacity and improved high temperature storage characteristics and cycle characteristics.

As measures for increasing the capacity of the battery, it has been ordinarily employed such a design method that an electrode active substance is packed into the limited battery volume in an amount as large as possible, for example, the electrode active substance is compressed to increase the density thereof. However, another problem arises upon increasing the capacity of the battery. For example, upon decreasing the void in the battery, the battery internal pressure is significantly increased upon forming a gas even in a small amount due to decomposition of the electrolytic solution.

In the case where a battery is used as a backup power source for power outage or a power source for a portable device, a continuous charging method is employed, in which a weak electric current is supplied to the battery to compensate the self-discharge of the battery for the charged state maintained. In the continuous charging method, the electrode is always in a state with high activity, whereby the decrease of the battery capacity is accelerated, and a gas is liable to be generated through decomposition of the electrolytic solution. In a cylindrical battery having a safety valve acting upon detecting abnormal increase of the internal pressure due to overcharge, there are some cases where the safety valve is opened upon forming a large amount of a gas. In a prismatic battery having no safety valve, the battery is expanded or broken in severe cases due to the pressure of the gas formed.

Therefore, a lithium secondary battery is being strongly demanded that gas is suppressed to be formed upon continuous charging, as well as the capacity is suppressed to be decreased.

In the lithium secondary battery disclosed in Patent Document 1 using an electrolytic solution formed by dissolving $LiPF_6$ in a nonaqueous solvent containing (1) ethylene carbonate, (2) methylethyl carbonate and (3) vinylene carbonate, however, there is substantially no effect on preventing decrease of the capacity and on decreasing the gas generation amount upon continuous charging, although the cycle characteristics are improved.

In the secondary battery disclosed in Patent Document 2 using an electrolytic solution containing $LiPF_6$ and $LiBF_4$ as lithium compounds, furthermore, the battery characteristics are deteriorated upon storing under high temperature conditions of 80° C. or higher, and the cycle characteristics are insufficient.

In the secondary battery disclosed in Patent Document 3 using an electrolytic solution containing the particular cyclic imide salt as a lithium compound, moreover, all the storage characteristics, the cycle characteristics and the continuous charging characteristics cannot be maintained simultaneously at high levels upon being produced to have a high capacity, and in particular, the battery characteristics are deteriorated upon storing under high temperature conditions, although aluminum can be prevented from being corroded.

[Patent Document 1]
JP-A-11-185806

[Patent Document 2]
JP-A-8-64237

[Patent Document 3]
JP-W-11-512563

DISCLOSURE OF THE INVENTION

The invention has been accomplished in view of the aforementioned situations of the conventional art, and an object thereof is to provide such a lithium secondary battery that has a high capacity, is excellent in storage characteristics, cycle characteristics and continuous charging characteristics, and is small in gas generation amount.

As a result of earnest investigations made by the inventors, it has been found that a nonaqueous electrolytic solution formed by dissolving $LiPF_6$, and $LiBF_4$ and/or a lithium salt represented by the formula (1) in a nonaqueous solvent containing a particular combination of solvents is small in capacity decrease upon continuous charging and is small in gas generation amount upon continuous charging, whereby the invention has been completed.

The invention relates to, as a first aspect, a nonaqueous electrolytic solution containing a lithium salt and a nonaqueous solvent dissolving the same, characterized in that the electrolytic solution contains, as the lithium salt, $LiPF_6$ in a concentration of from 0.2 to 2 mole/L, and $LiBF_4$ and/or a compound represented by the following formula (1) in a molar ratio of from 0.005 to 0.4 with respect to $LiPF_6$, and the nonaqueous solvent mainly contains (1) ethylene carbonate and/or propylene carbonate, (2-1) a symmetric linear carbonate, (2-2) an asymmetric linear carbonate, and (3) vinylene carbonate.

The invention also relates to, as a second aspect, a nonaqueous electrolytic solution containing a lithium salt and a nonaqueous solvent dissolving the same, characterized in that the electrolytic solution contains, as the lithium salt, $LiPF_6$ in a concentration of from 0.2 to 2 mole/L and $LiBF_4$ in a concentration of from 0.001 to 0.3 mole/L, and the nonaqueous solvent mainly contains (1) ethylene carbonate and/or propylene carbonate, (2-1) a symmetric linear carbonate, (2-2) an asymmetric linear carbonate, and (3) vinylene carbonate.

The invention also relates to, as a third aspect, a nonaqueous electrolytic solution containing a lithium salt and a nonaqueous solvent dissolving the same, characterized in that the electrolytic solution contains, as the lithium salt, $LiPF_6$ in a concentration of from 0.5 to 2.5 mole/L and a compound represented by the following formula (1) in a concentration of from 0.001 to 0.3 mole/L:

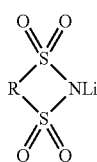
(1)

(In the formula, R represents a linear or branched alkylene group having from 1 to 20 carbon atoms, which may be substituted by a fluorine atom, provided that the alkylene chain except for a side chain has 12 or less carbon atoms.)

Figure 1:
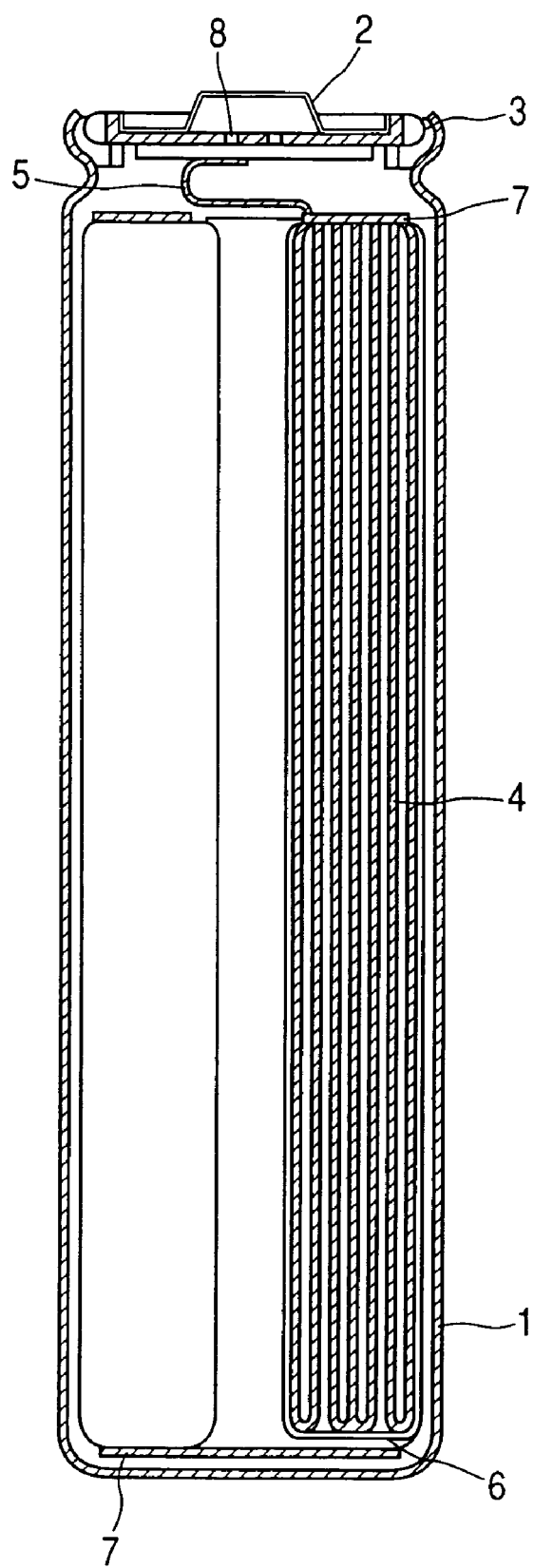
FIG. 1 is a schematic cross sectional view showing a cylindrical battery produced in the example.

In the figure, numeral 1 denotes a battery housing, 2 denotes a sealing plate, 3 denotes an insulating gasket, 4 denotes a spiral electrode assembly, 5 denotes a positive electrode terminal, 6 denotes a negative electrode terminal, 7 denotes an insulating ring, and 8 denotes an electric current interrupting device.

BEST MODE FOR CARRYING OUT THE INVENTION

The nonaqueous electrolytic solution according to the invention mainly containing a lithium salt and a nonaqueous solvent dissolving the same, as similar to the ordinary nonaqueous electrolytic solutions, and the first characteristic feature thereof resides in that $LiPF_6$, and $LiBF_4$ and/or the lithium salt represented by the formula (1) are used in combination as the lithium salt, $LiPF_6$ is contained in a particular concentration, and $LiBF_4$ and/or the lithium salt represented by the formula (1) is contained in a particular proportion with respect to $LiPF_6$.

The concentration of $LiPF_6$ in the nonaqueous electrolytic solution is from 0.2 to 2 mole/L. In the case where the concentration of $LiPF_6$ is too high or too low, there are some cases where the electroconductivity of the electrolytic solution is lowered to deteriorate the battery characteristics. The concentration of $LiPF_6$ is preferably 0.3 mole/L or more, and in particular 0.6 mole/L or more, and is preferably 1.8 mole/L or less, and in particular 1.5 mole/L or less. In the aforementioned ranges of the concentration of the $LiPF_6$, the upper limits and the lower limits may be arbitrarily combined.

In the case where $LiPF_6$ is used in combination with the lithium salt represented by the formula (1), the concentration of $LiPF_6$ in the nonaqueous electrolytic solution may be from 0.5 to 2.5 mole/L. The concentration of $LiPF_6$ in this case is preferably 0.6 mole/L or more, and in particular 0.7 mole/L or more, and is preferably 1.8 mole/L or less, and in particular 1.5 mole/L or less. In the aforementioned ranges of the concentration of the $LiPF_6$, the upper limits and the lower limits may be arbitrarily combined.

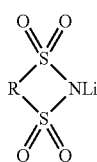
(1)

In the formula (1), R represents a linear or branched alkylene group having from 1 to 20 carbon atoms, preferably from 2 to 12 carbon atoms, which may be substituted by a fluorine atom, provided that the alkylene chain except for a side chain has from 1 to 12 carbon atoms, and preferably from 2 to 8 carbon atoms. The alkyl group constituting the side chain of the alkylene group generally has from 1 to 8 carbon atoms, and preferably from 1 to 4 carbon atoms, and may be linear or branched.

Examples of the linear alkylene group include an ethylene group, a trimethylene group, a tetramethylene group and a pentamethylene group. Examples of the branched alkylene group include a 1-methyl-ethylene group (propylene group), a 2-methyl-trimethylene group and a neopenthylene group. The fluorine atom may be substituted with an arbitrary hydrogen atom of the alkylene group, and in the case where the alkylene group is substituted by a fluorine atom, a perfluoroalkylene group having all the hydrogen atoms of the alkylene group substituted by fluorine atoms is preferred.

pecific examples of the lithium salt represented by the formula (1) include lithium cyclic 1,2-ethanedisulfonylimide, lithium cyclic 1,3-propanedisulfonylimide, lithium cyclic 1,2-perfluoroethanedisulfonylimide, lithium cyclic 1,3-perfluoropropanedisulfonylimide and lithium cyclic 1,4-perfluorobutanesulfonylimide. Among these, lithium cyclic 1,2-perfluoroethanedisulfonylimide and lithium cyclic 1,3-perfluoropropanedisulfonylimide are preferred.

The molar ratio of $LiBF_4$ or the lithium salt represented by the formula (1) with respect to $LiPF_6$ is generally 0.005 or more, preferably 0.01 or more, and particularly preferably 0.05 or more, and is generally 0.4 or less, preferably 0.2 or less, and more preferably 0.15 or less. In the aforementioned molar ranges, the upper limits and the lower limits may be arbitrarily combined.

In the case where the molar ratio is too large, there is such a tendency that the battery characteristics are lowered, and in the case where it is too small, it is difficult to suppress gas generation and capacity deterioration upon continuous charging. In the case where $LiBF_4$ and the lithium salt represented by the formula (1) are simultaneously contained, the total amount thereof is in the aforementioned ranges.

The concentration of $LiBF_4$ or the lithium salt represented by the formula (1) in the nonaqueous electrolytic solution is generally from 0.001 to 0.3 mole/L. In the case where the concentration of $LiBF_4$ or the lithium salt represented by the formula (1) is too low, it is difficult to suppress gas generation and capacity deterioration upon continuous charging.

In the case where it is too high, there is such a tendency that the battery characteristics are lowered after storing at a high temperature. The concentration of $LiBF_4$ or the lithium salt represented by the formula (1) is preferably 0.01 mole/L or more, particularly 0.02 mole/L or more, and most preferably 0.05 mole/L or more. The upper limit thereof is preferably 0.25 mole/L or less, and most preferably 0.18 mole/L or less. In the case where $LiBF_4$ and the lithium salt represented by the formula (1) are simultaneously contained, the total amount thereof is in the aforementioned ranges.

In the case where the electrolytic solution contains, as the lithium salt, $LiPF_6$ and the lithium salt represented by the formula (1), the lower limit of the molar ratio of the lithium salt represented by the formula (1) with respect to $LiPF_6$ may be arbitrarily determined, and preferably 0.005 or more. In the case where the ratio is lower than the lower limit, there are some cases where it is difficult suppress sufficiently gas generation and capacity deterioration upon continuous charging, and therefore, it is preferably 0.01 or more, and particularly 0.02 or more. The upper limit of the ratio may also be arbitrarily determined, but in the case where the ratio is too large, there is such a tendency that the battery characteristics are lowered after storing at a high temperature, and therefore, it is preferably 0.5 or less, and particularly 0.2 or less.

In the case where the electrolytic solution contains, as the lithium salt, $LiPF_6$ and the lithium salt represented by the formula (1), the total amount of $LiPF_6$ and the lithium salt represented by the formula (1) in the nonaqueous electrolytic solution is preferably from 0.7 to 1.7 mole/L while the concentrations and the ratios thereof may be in the aforementioned ranges.

In the nonaqueous electrolytic solution of the invention, other lithium salts that are used in this purpose other than $LiPF_6$, $LiBF_4$ and the lithium salt represented by the formula (1). Examples of the other lithium salts include an inorganic lithium salt, such as $LiClO_4$; and a fluorine-containing organic acid lithium salt, such as $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_4(C_2F_5)_2$, $LiPF_4(CF_4SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$.

In the case where the other lithium salt is added, the concentration of the other lithium salt in the electrolytic solution is preferably 0.5 mole/L or less, and particularly preferably 0.2 mole/L or less. The lower limit thereof may be arbitrarily determined, and in general, in order to exert certain sort of effects by the addition, it is preferably 0.01 mole/L or more, and particularly 0.05 mole/L or more.

In the case where one selected from $LiN(CF_3SO_2)_2$, $LiN(C_2F_5SO_2)_2$ and $LiCF_3SO_3$, particularly $LiN(CF_3SO_2)_2$, is contained in a concentration of from 0.001 to 0.2 mole/L, gas generation upon continuous charging can further be suppressed. In the case where the concentration is too low, the effect cannot be exerted. The concentration is preferably 0.003 mole/L or more, particularly preferably 0.005 mole/L or more, and most preferably 0.008 mole/L or more. The upper limit thereof is preferably 0.15 mole/L or less, and particularly preferably 0.1 mole/L or less.

The second characteristic feature of the invention resides in that the nonaqueous solvent mainly contains (1) ethylene carbonate and/or propylene carbonate, (2-1) a symmetric linear carbonate, (2-2) an asymmetric linear carbonate, and (3) vinylene carbonate.

(1) Ethylene Carbonate and/or Propylene Carbonate

Ethylene carbonate and propylene carbonate may be used solely or may be used in combination with each other, and it is preferred that ethylene carbonate is used solely or is used in combination with propylene carbonate.

In the case where ethylene carbonate and propylene carbonate are used in combination, the volume ratio (EC/PC) of ethylene carbonate (EC) and propylene carbonate (PC) is generally 99/1 or less, and preferably 95/5 or less, and is generally 40/60 or more, and preferably 50/50 or more.

In the case where the amount of propylene carbonate is too large, it is not preferred particularly in a battery having a negative electrode using graphite as an active substance since propylene carbonate is liable to be decomposed on the surface of graphite. In this specification, the volume of the nonaqueous solvent is a value at 25° C., and the volume of ethylene carbonate is a value at the melting point thereof.

(2) Linear Carbonate (2-1) Symmetric Linear Carbonate

Examples of the symmetric linear carbonate include dimethyl carbonate, diethyl carbonate and di-n-propyl carbonate. Among these, those having 5 or less carbon atoms are preferred, and dimethyl carbonate and diethyl carbonate are particularly preferred. These may be used solely or in combination of two or more kinds of them.

(2-2) Asymmetric Linear Carbonate

Examples of the asymmetric linear carbonate include ethylmethyl carbonate, methyl-n-propyl carbonate and ethyl-n-propyl carbonate. Among these, those having 5 or less carbon atoms are preferred, and ethylmethyl carbonate is particularly preferred. These may be used solely or in combination of two or more kinds of them.

The volume ratio of the total amount of ethylene carbonate and propylene carbonate and the total amount of the symmetric linear carbonate and the asymmetric linear carbonate in the nonaqueous electrolytic solution is generally from 10/90 to 70/30, preferably from 10/90 to 50/50, particularly preferably from 10/90 to 45/55, and most preferably from 15/85 to 40/60. In the case where the total amount of the symmetric linear carbonate and the asymmetric linear carbonate is too small, the viscosity of the electrolytic solution is increased, whereas in the case where the total amount thereof is too large, the dissociation degree of the lithium salt is decreased, and in both cases, there is such a possibility that the electroconductivity of the electrolytic solution is decreased.

Specific examples of the combination of ethylene carbonate and the linear carbonate include a combination of ethylene carbonate, dimethyl carbonate and ethylmethyl carbonate, a combination of ethylene carbonate, diethyl carbonate and ethylmethyl carbonate, and a combination of ethylene carbonate, dimethyl carbonate, diethyl carbonate and ethylmethyl carbonate, and these combinations provide such an electrolytic solution that is good in balance between the cycle characteristics and the large current discharge characteristics. Combinations obtained by further adding propylene carbonate to the aforementioned combinations of ethylene carbonate and the linear carbonate are also included in the preferred combinations.

(3) Vinylene Carbonate

The proportion of vinylene carbonate in the nonaqueous electrolytic solution except for the lithium salt is generally 0.01% by weight or more, preferably 0.1% by weight or more, particularly preferably 0.3% by weight or more, and most preferably 0.5% by weight or more, and is generally 8% by weight or less, preferably 5% by weight or less, and particularly preferably 3% by weight or less. In the aforementioned proportions of vinylene carbonate, the lower limits and the upper limits may be arbitrarily combined.

It is considered that vinylene carbonate has such a function that a film is formed on the surface of the negative electrode to improve the cycle characteristics, and in the case where the proportion of vinylene carbonate is too small, the cycle characteristics cannot be sufficiently improved. In the case where the proportion is too large, on the other hand, there are some cases where the inner pressure of the battery is increased due to gas generation upon storing at a high temperature.

In the nonaqueous electrolytic solution of the invention, it is preferred that the major component of the nonaqueous solvent is formed by combining ethylene carbonate, propylene carbonate, the symmetric linear carbonate and the asymmetric linear carbonate, and vinylene carbonate.

The total amount of ethylene carbonate, propylene carbonate, the symmetric linear carbonate and the asymmetric linear carbonate, and vinylene carbonate in the nonaqueous electrolytic solution except for the lithium salt is preferably 80% by weight or more. In total amount is further preferably 90% by weight or more, and particularly preferably 93% by weight or more. A nonaqueous electrolytic solution having the total amount thereof in the aforementioned ranges is preferred owing to good balance between the cycle characteristics and the large current discharge characteristics.

Examples of a nonaqueous solvent other than vinylene carbonate, ethylene carbonate, propylene carbonate, the symmetric linear carbonate and the asymmetric linear carbonate include a cyclic carbonate having 5 or more carbon atoms, such as butylene carbonate; a cyclic ether, such as tetrahydrofuran and 2-methyltetrahydrofuran; a linear ether, such as dimethyoxyethane and dimethoxymethane; a cyclic carboxylic acid ester, such as γ-butyrolactone and γ-valerolactone; and a linear carboxylic acid ester, such as methyl acetate, methyl propionate, ethyl propionate and methyl butyrate. These may be used solely or in combination of two or more kinds of them. In the case where the nonaqueous electrolytic solution contains these nonaqueous solvents, the proportion thereof in the nonaqueous electrolytic solution except for the lithium salt is generally 20% by weight or less.

The mechanism that the nonaqueous electrolytic solution of the invention exerts small deterioration in discharge characteristics can be expected as follows, while it is not completely clear.

Vinylene carbonate forms a stable film on the surface of the negative electrode to improve the cycle characteristics. However, because vinylene carbonate is liable to react with the positive electrode material in the charged state, and the positive electrode is always in a highly active state upon continuous charging with a constant voltage, the reaction proceeds between vinylene carbonate and the positive electrode material to cause such possibilities that deterioration of the positive electrode active substance is accelerated, and the gas generation amount is increased. Furthermore, the component of the film formed on the surface of the negative electrode is partly dissolved into the electrolytic solution, and the dissolved substance is reacted with the surface of the positive electrode to cause acceleration of deterioration of the positive electrode active substance, and generation of gas.

On the other hand, a decomposed substance derived from $LiBF_4$ suppresses the aforementioned reaction on the positive electrode, and furthermore, the substance does not inhibit the film formation by vinylene carbonate on the surface of the negative electrode. Moreover, a part of $LiBF_4$ is reduced on the surface of the negative electrode to form a composite film of vinylene carbonate and $LiBF_4$ on the negative electrode. The composite film is thermally stable and excellent in permeability of lithium ions. Furthermore, the composite film is difficult to be dissolved to suppress dissolution of the film components, and as a result, side reactions inside the battery are suppressed to suppress deterioration of the electrode active substances, whereby good discharge characteristics are maintained.

$LiBF_4$ is liable to react with the negative electrode material in the charged state as compared to $LiPF_6$, and facilitates the side reaction with the negative electrode material in the case where vinylene carbonate is not contained, but $LiBF_4$ forms a stable film on the surface of the negative electrode under coexistence with vinylene carbonate, and the film suppresses the side reaction with the negative electrode material.

As having been described, improvement in cycle characteristics and prevention of deterioration in discharge characteristics upon continuous charging can be attained by the mutual action between vinylene carbonate and $LiBF_4$.

In particular, it is preferred that the proportion of vinylene carbonate in the nonaqueous electrolytic solution except for the lithium salt is 0.3% by weight or more, and the concentration of $LiBF_4$ in the nonaqueous electrolytic solution is 0.02 mole/L or more, since the effect of the invention is conspicuous.

While the mechanism of the function of the lithium salt represented by the formula (1) is not completely clear, the lithium salt represented by the formula (1) or a decomposed substance derived from the lithium salt suppresses the reactivity of the positive electrode by adsorption or coating on the active sites of the positive electrode, whereby the side reactions of vinylene carbonate and the other components of the electrolytic solution on the positive electrode are suppressed. It is considered furthermore that the lithium salt represented by the formula (1) does not inhibit the film formation by vinylene carbonate on the surface of the negative electrode to facilitate formation of the stable film excellent in permeability of lithium ions, and therefore, improvement in cycle characteristics, and suppression of gas generation and improvement in discharge characteristics upon continuous charging are attained.

The nonaqueous electrolytic solution of the invention may contain other components depending on necessity, for example, a conventionally known assistant, such as an overcharge preventing agent, a dehydrating agent and an acid remover.

Examples of the overcharge preventing agent include an aromatic compound, such as biphenyl, an alkylbiphenyl, terphenyl, a partially hydrogenated product of terphenyl, cyclohexylbenzene, t-butylbenzene, t-amylbenzene, diphenyl ether and dibenzofuran; a partially fluorinated product of the aforementioned aromatic compound, such as 2-fluorobiphenyl, o-cyclohexylfluorobenzene and p-cyclohexylfluorobenzene; and a fluorine-containing anisole compound, such as 2,4-difluoroanisole, 2,5-difluoroanisole and 2,6-difluoroanisole. Among these, an aromatic compound having no fluorine substituted is preferred.

These may be used solely or in combination of two or more kinds of them. In the case where two or more kinds of them are used in combination, it is particularly preferred that one selected from an aromatic compound containing no oxygen, such as biphenyl, an alkylbiphenyl, terphenyl, a partially hydrogenated product of terphenyl, cyclohexylbenzene, t-butylbenzene and t-amylbenzene, is combined with an oxygen-containing aromatic compound, such as diphenyl ether and dibenzofuran. In the case where the nonaqueous electrolytic solution contains the overcharge preventing agent, the concentration thereof is generally from 0.1 to 5% by weight. Upon containing the overcharge preventing agent in the nonaqueous electrolytic solution, it is preferred since breakage and firing of the battery due to overcharge can be prevented to improve the safety of the battery.

In general, since the overcharge preventing agent is liable to react on the positive electrode and the negative electrode as compared to the nonaqueous solvent constituting the nonaqueous electrolytic solution, and thus, it reacts with a highly active site of the electrode upon continuous charging and storing at a high temperature to increase the internal resistance of the battery and to generate gas, so as to cause considerable deterioration in discharge characteristics upon continuous charging and storing at a high temperature. In the case where the overcharge preventing agent is added to the nonaqueous electrolytic solution of the invention, however, it is preferred since deterioration in discharge characteristics can be suppressed.

Examples of an assistant for improving the capacity maintenance characteristics and the cycle characteristics after storing at a high temperature include a carbonate compound, such as vinylethylene carbonate, fluoroethylene carbonate, trifluoropropylene carbonate, phenylethylen carbonate, ervthritan carbonate and spiro-bis-dimethylene carbonate; a carboxylic anhydride, such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride and phenylsuccinic anhydride; a sulfur-containing compound, such as ethylene sulfite, 1,3-propanesultone, 1,4-butanesultone, methyl methanesulfonate, busulfan, sulfolane, sulfolene, dimethylsulfone, diphenylsulfone, methylphenylsulfone, dibutyldisulfide, dicyclohexyldisulfide, tetramethylthiuram monosulfide, N,N-dimethylmethanesulfoneamide and N,N-diethylmethanesulfoneamide; a nitrogen-containing compound, such as 1-methyl-2-pyrrolidinone, 1-methyl-2-piperidone, 3-methyl-2-oxazolidinone, 1,3-dimethyl-2-imidazolidinone and N-methylsuccinimide; a hydrocarbon compound, such as heptane, octane and cycloheptane; and a fluorine-containing compound, such as fluorobenzene, difluorobenzene, hexafluorobenzene and benzotrifluoride These may be used solely or in combination of two or more kinds of them. In the case where the nonaqueous electrolytic solution contains the assistant, the concentration thereof is generally from 0.1 to 5% by weight.

The nonaqueous electrolytic solution of the invention can be prepared by dissolving $LiPF_6$, $LiBF_4$ and/or the lithium salt represented by the formula (1), and depending on necessity, the other compounds in a nonaqueous solvent mainly containing (1) ethylene carbonate and/or propylene carbonate, (2-1) the symmetric linear carbonate, (2-2) the asymmetric linear carbonate and (3) vinylene carbonate. Upon preparing the nonaqueous electrolytic solution, it is preferred that the raw materials are previously dehydrated, and in general, they are preferably dehydrated to 50 ppm or less, and preferably 30 ppm or less.

The nonaqueous electrolytic solution of the invention is suitable for use as an electrolytic solution of a secondary battery, particularly a lithium secondary battery. A lithium secondary battery according to the invention using the electrolytic solution will be described below.

The lithium secondary battery of the invention is the same as the conventionally known lithium secondary battery except for the electrolytic solution, and has such a structure that a positive electrode and a negative electrode are housed in a housing through a porous film impregnated with an electrolytic solution according to the invention. Therefore, the secondary battery may have an arbitrary shape, such as a cylindrical shape, a prismatic shape, a laminated shape, a coin shape and a large size shape.

The lithium secondary battery using the electrolytic solution of the invention forms a smaller amount of gas in the continuous charging state, as having been described. Therefore, in the case where the electrolytic solution of the invention is used in a battery having an electric current breaker functioning by increase of the inner pressure of the battery in an abnormal state, such as overcharge, an abnormal operation of the electric current breaker can be prevented from occurring in the continuous charging state.

A problem of expansion of a battery due to increase of the inner pressure of the battery is liable to occur in a battery having an outer housing formed with metallic aluminum or an aluminum alloy having a thickness of 0.5 mm or less, particularly 0.4 mm or less, and a battery having a volume capacity density of 110 mAh/cc or more, further 130 mAh/cc or more, particularly 140 mAh/cc or more, but the use of the electrolytic solution of the invention can prevent the expansion of the battery.

Examples of the negative electrode active substance include a carbonaceous material and a metallic compound capable of occluding and releasing lithium, metallic lithium and a lithium alloy. These may be used solely or in combination of two or more kinds of them.

Among these, a carbonaceous material, particularly graphite or a graphite material having the surface thereof coated with carbon that is amorphous as compared to graphite, is preferred.

Graphite preferably has a d value (interlayer distance) of the lattice plane (002 plane) obtained by X-ray diffraction according to the JSPS method of from 0.335 to 0.338 nm, and particularly preferably from 0.335 to 0.337 nm. The crystallite size (Lc) obtained by X-ray diffraction according to the JSPS method is preferably 30 nm or more, further preferably 50 nm or more, and particularly preferably 100 nm or more. The ash content is preferably 1% by weight or less, further preferably 0.5% by weight or less, and particularly preferably 0.1% by weight or less.

The graphite material having the surface thereof coated with amorphous carbon preferably has such a structure that graphite having a d value of the lattice plane (002 plane) on X-ray diffraction of from 0.335 to 0.338 nm is used as a core material, and a carbonaceous material having a d value of the lattice plane (002 plane) on X-ray diffraction larger than that of the core material is attached to the core material, with the ratio of the core material and the carbonaceous material having d value of the lattice plane (002 plane) on X-ray diffraction larger than that of the core material being from 99/1 to 80/20 in terms of weight ratio. A negative electrode that has a high capacity and is difficult to react with the electrolytic solution can be produced by using the material.

The particle diameter of the carbonaceous material is preferably 1 μm or more, further preferably 3 μm or more, particularly preferably 5 μm or more, and most preferably 7 μm or more, in terms of a median diameter by the laser diffraction and scattering method. The upper limit thereof is preferably 100 μm or less, further preferably 50 μm or less, particularly preferably 40 μm or less, and most preferably 30 μm or less.

The specific surface area of the carbonaceous material by the BET method is preferably 0.3 $m^2/g$ or more, further preferably 0.5 $m^2/g$ or more, particularly preferably 0.7 $m^2/g$ or more, and most preferably 0.8 $m^2/g$ or more. The upper limit thereof is preferably 25.0 $m^2/g$ or less, further preferably 20.0 $m^2/g$ or less, particularly preferably 15.0 $m^2/g$ or less, and most preferably 10.0 $m^2/g$ or less.

The carbonaceous material preferably has an R value ($=I_B/I_A$) in a range of from 0.01 to 0.7, which is represented by a ratio of a peak strength $I_A$ of a peak $P_A$ within a range of from 1,570 to 1,620 $cm^{-1}$ in a raman spectrum obtained by using argon laser light and a peak strength $I_B$ of a peak $P_B$ within a range of from 1,300 to 1,400 $cm^{-1}$ in the spectrum. The half value width of a peak within a range of from 1,570 to 1,620 $cm^{-1}$ thereof is preferably 26 $cm^{-1}$ or less, and particularly preferably 25 $cm^{-1}$ or less.

Examples of the metallic compound capable of occluding and releasing lithium include compounds containing a metal, such as Ag, Zn, Al, Ga, In, Si, Ge, Sn, Pb, P, Sb, Bi, Cu, Ni, Sr and Ba, and these metals may be used as an elemental substance, an oxide or an alloy with lithium. In the invention, a compound containing an element selected from Si, Sn, Ge and Al is preferred, and an oxide or a lithium alloy of a metal selected from Si, Sn and Al is more preferred.

The metallic compound capable of occluding and releasing lithium or an oxide or a lithium alloy thereof generally has a larger capacity per unit weight than a carbonaceous material represented by graphite, and therefore, it is preferred for a lithium secondary battery, which is demanded to have a higher energy density.

Examples of the positive electrode active substance include a material capable of occluding and releasing lithium, for example, a lithium-transition metal complex oxide, such as a lithium-cobalt oxide, a lithium-nickel oxide and a lithium-manganese oxide, and a complex oxide obtained by substituting a part of the transition metal of the aforementioned complex oxide by another metal. Examples of these compounds include $Li_xCoO_2$, $Li_xNiO_2$, $Li_xMnO_2$, $Li_xCo_{1-y}M_yO_2$, $Li_xNi_{1-y}M_yO_2$ and $Li_xMn_{1-y}M_yO_2$, wherein M represents at least one selected from Fe, Co, Ni, Mn, Mg, Cu, Zn, Al, Sn, B, Ga, Cr, V, Sr and Ti, $0.4 \leq x \leq 1.2$, and $0 \leq y \leq 0.6$.

In particular, a compound obtained by substituting a part of cobalt, nickel or manganese by another metal, such as $Li_xCo_{1-y}M_yO_2$, $Li_xNi_{1-y}M_yO_2$ and $Li_xMn_{1-y}M_yO_2$, is preferred owing to the stable structure thereof. The positive electrode active substance may be used solely or in combination of plural kinds of thereof.

A binder for binding the active substance may be an arbitrary material that is stable to a solvent used upon producing the electrode and to the electrolytic solution. Examples thereof include a fluorine resin, such as polyvinylidene fluoride and polytetrafluoroethylene, polyolefin, such as polyethylene and polypropylene, a polymer having an unsaturated bond and a copolymer thereof, such as styrene-butadiene rubber, isoprene rubber and butadiene rubber, and an acrylic acid polymer and a copolymer thereof, such as an ethylene-acrylic acid copolymer, an ethylene-methacrylic acid copolymer.

The electrode may contain a thickening agent, an electroconductive material, a filler and the like for improving the mechanical strength and the electroconductivity.

Examples of the thickening agent include carboxymethyl cellulose, methyl cellulose, hydroxymethyl cellulose, ethyl cellulose, polyvinyl alcohol, starch oxide, starch phosphate and casein.

Examples of the electroconductive material include a metallic material, such as copper and nickel, and a carbon material, such as graphite and carbon black.

The electrode may be produced according to the ordinary process. For example, a binder, a thickening agent, an electroconductive material, a solvent and the like are added to a negative electrode or positive electrode active substance to form slurry, and the slurry is coated on a current collector, followed by being dried and pressed, to produce the electrode.

The density of the negative electrode active substance layer after drying and pressing is generally 1.45 $g/cm^3$ or more, preferably 1.55 $g/cm^3$ or more, and particularly preferably 1.60 $g/cm^3$ or more. The density of the negative electrode active substance layer is preferably as high as possible owing to the higher capacity of the battery. The density of the positive electrode substance layer after drying and pressing is generally 3.0 $g/cm^3$ or more.

It is also possible that an active substance having a binder, an electroconductive material and the like added thereto is molded as it is by rolling to form a sheet electrode, or is formed into a pellet electrode by compression molding, or a thin film of the electrode material is formed on the current collector by such a method as vapor deposition, sputtering or plating.

Various kinds of current collectors may be used, and in general, a metal or an alloy is employed. Examples of the current collector for the negative electrode include copper, nickel and stainless steel, and copper is preferably used. Examples of the current collector for the positive electrode include a metal, such as aluminum, titanium and tantalum, and an alloy thereof, and aluminum and an alloy thereof are preferably used.

A porous film is generally intervening between the positive electrode and the negative electrode for preventing short circuiting. In this case, the electrolytic solution is used by impregnating in the porous film. The material and the shape of the porous film are not particularly limited as far as it is stable to the electrolytic solution and is excellent in liquid holding capability, and a porous sheet, a nonwoven fabric and the like formed with polyolefin, such as polyethylene and polypropylene, as a raw material are preferred.

The material for the outer housing used in the battery of the invention may also be arbitrarily selected, and nickel-plated iron, stainless steel, aluminum or an alloy thereof, nickel, titanium and the like are used.

EXAMPLES

The invention will be more specifically described with reference to the following examples and comparative examples, but the invention is not limited to the examples unless they deviate from the substance of the invention.

[Production of Negative Electrode (1)]

94 parts by weight of graphite having a d value of the lattice plane (002 plane) on X-ray diffraction of 0.336 nm, a crystallite size (Lc) of 652 nm, an ash content of 0.07% by weight, a median diameter by the laser diffraction and scattering method of 12 μm, a BET specific surface area of 7.5 m$^2$/g, a intensity ratio R=$I_B/I_A$ of a peak strength $I_A$ of a peak $P_A$ within a range of from 1,570 to 1,620 cm$^{-1}$ in a raman spectrum obtained by using argon laser light and a peak strength $I_B$ of a peak $P_B$ within a range of from 1,300 to 1,400 cm$^{-1}$ in the spectrum of 0.12, and a half value width of a peak within a range of from 1,570 to 1,620 cm$^{-1}$ in the spectrum of 19.9 cm$^{-1}$, and 6 parts by weight of polyvinylidene fluoride (KF-1000, a trade name, produced by Kureha Chemical Industry Co., Ltd.) were mixed, to which N-methyl-2-pyrrolidone was added, to form slurry. The slurry was uniformly coated and dried on one surface of a copper foil having a thickness of 18 μm, and then pressed to make a negative electrode active substance layer having a density of 1.5 g/cm$^3$, so as to produce a negative electrode (1).

[Production of Negative Electrode (2)]

A negative electrode (2) was produced in the same manner as in the production of the negative electrode (1) except that a copper foil having a thickness of 12 μm was used, and the slurry was uniformly coated and dried on both surfaces of the copper foil, and then pressed to make a negative electrode active substance layer having a density of 1.55 g/cm$^3$.

[Production of Positive Electrode (1)]

85 parts by weight of LiCoO$_2$, 6 parts by weight of carbon black and 9 parts by weight of polyvinylidene fluoride were mixed, to which N-methyl-2-pyrrolidone was added, to form slurry, and the slurry was uniformly coated and dried on both surfaces of an aluminum foil having a thickness of 20 μm, and then pressed to make a positive electrode active substance layer having a density of 3.0 g/cm$^3$, so as to produce a positive electrode (1).

[Production of Positive Electrode (2)]

A positive electrode (2) was produced in the same manner as in the production of the positive electrode (1) except that an aluminum foil having a thickness of 14 μm was used.

[Production of Cylindrical Lithium Secondary Battery]

The positive electrode (2) and the negative electrode (2) were wound along with a polyethylene separator to prevent the positive electrode and the negative electrode from being in contact with each other, and the outermost circumference was secured with a tape to obtain a spiral electrode assembly. Subsequently, as shown in FIG. 1, insulating rings 7 were placed on top and bottom ends of the spiral electrode assembly 4, which was inserted into a stainless steel battery housing formed into a cylindrical shape functioning as a negative electrode terminal. Thereafter, a negative electrode terminal 6 connected to the negative electrode of the spiral electrode assembly 4 was welded to the inside of the battery housing 1, and a positive electrode terminal 5 connected to the positive electrode of the electrode assembly was welded to a bottom of an electric current breaker 8 functioning when the gas pressure in the battery reached a prescribed pressure. The electric current breaker and an explosion-proof valve were attached to a bottom of a sealing plate 2. After charging an electrolytic solution described later into the battery housing 1, an opening of the battery housing 1 was sealed with the sealing plate and a polypropylene insulating gasket 3 to produce a cylindrical battery having a volume capacity density of 133 mAh/cc.

[Evaluation of Capacity of Cylindrical Battery]

The cylindrical battery was charged at 25° C. with a constant electric current corresponding to 0.2 C until 4.2 V, and then discharged with a constant electric current corresponding to 0.2 C until 3 V. The operation was repeated three cycles to stabilize the battery, and in the fourth cycle, the battery was charged with a constant electric current of 0.5 C until 4.2 V and further charged with a constant voltage of 4.2 V until the electric current value reached 0.05 C, followed by discharging with a constant electric current of 0.2 C until 3 V, to obtain an initial discharge capacity.

The term 1 C herein means such an electric current value that discharges the reference capacity of the battery over 1 hour, and 0.2 C means ⅕ of the electric current value.

[Evaluation of Continuous Charging Characteristics of Cylindrical Battery]

The cylindrical battery after completing the evaluation of capacity was charged at 60° C. with a constant electric current of 0.5 C until 4.2 V, and then further continuously charged with a constant voltage for 2 weeks.

After cooling the battery, the battery was discharged at 25° C. with a constant electric current of 0.2 C until 3 V, and then the remaining capacity after the continuous charging test was measured, so as to obtain a remaining capacity after continuous charging with the discharge capacity before the continuous charging test being 100.

[Evaluation of Cycle Characteristics of Cylindrical Battery]

The cylindrical battery after completing the evaluation of capacity was subjected to a cycle test, in which the battery was charged at 25° C. with a constant electric current of 1 C until 4.2 V, and further charged with a constant voltage of 4.2 V until the electric current value reached 0.05 C, and the battery was then discharged with a constant electric current of 1 C until 3 V. The discharge capacity after 100 cycles was obtained with the discharge capacity before the cycle test being 100.

Example 1

Under an argon dry atmosphere, 2 parts by weight of vinylene carbonate was added to 98 parts by weight of a mixture of ethylene carbonate, ethylmethyl carbonate, dimethyl carbonate and diethyl carbonate (volume ratio: 2/4/2/2), in which LiPF$_6$ and LiBF$_4$, which had been sufficiently dried, were dissolved to make ratios of 1.0 mole/L and 0.05 mole/L, respectively, to produce an electrolytic solution.

A cylindrical lithium secondary battery was produced by using the electrolytic solution thus obtained, and evaluated for the characteristics after continuous charging and the cycle characteristics. The results are shown in Table 1.

Example 2

2 parts by weight of vinylene carbonate was added to 98 parts by weight of a mixture of ethylene carbonate and ethylmethyl carbonate (volume ratio: 2/8), in which $LiPF_6$ and $LiBF_4$, which had been sufficiently dried, were dissolved to make ratios of 1.0 mole/L and 0.05 mole/L, respectively, to produce an electrolytic solution.

A cylindrical lithium secondary battery was produced by using the electrolytic solution thus obtained, and evaluated for the characteristics after continuous charging and the cycle characteristics. The results are shown in Table 1.

Example 3

2 parts by weight of vinylene carbonate was added to 98 parts by weight of a mixture of ethylene carbonate and diethyl carbonate (volume ratio: 2/8), in which $LiPF_6$ and $LiBF_4$, which had been sufficiently dried, were dissolved to make ratios of 1.0 mole/L and 0.05 mole/L, respectively, to produce an electrolytic solution.

A cylindrical lithium secondary battery was produced by using the electrolytic solution thus obtained, and evaluated for the characteristics after continuous charging and the cycle characteristics. The results are shown in Table 1.

Comparative Example 1

$LiPF_6$, which had been sufficiently dried, was dissolved in a mixture of ethylene carbonate, ethylmethyl carbonate, dimethyl carbonate and diethyl carbonate (volume ratio: 2/4/2/2) to make a ratio of 1.0 mole/L, to produce an electrolytic solution.

A cylindrical lithium secondary battery was produced by using the electrolytic solution thus obtained, and evaluated for the characteristics after continuous charging and the cycle characteristics. The results are shown in Table 1.

Comparative Example 2

2 parts by weight of vinylene carbonate was added to 98 parts by weight of a mixture of ethylene carbonate, ethylmethyl carbonate, dimethyl carbonate and diethyl carbonate (volume ratio: 2/4/2/2), in which $LiPF_6$, which had been sufficiently dried, was dissolved to make a ratio of 1.0 mole/L, to produce an electrolytic solution.

A cylindrical lithium secondary battery was produced by using the electrolytic solution thus obtained, and evaluated for the characteristics after continuous charging and the cycle characteristics. The results are shown in Table 1.

The cylindrical battery suffered operation of the electric current breaker during the continuous charging test due to an increased inner pressure, and thus could not be discharged.

Example 4

2 parts by weight of vinylene carbonate and 1 part by weight of cyclohexylbenzene were added to 97 parts by weight of a mixture of ethylene carbonate, ethylmethyl carbonate, dimethyl carbonate and diethyl carbonate (volume ratio: 2/4/2/2), in which $LiPF_6$ and $LiBF_4$, which had been sufficiently dried, were dissolved to make ratios of 1.0 mole/L and 0.05 mole/L, respectively, to produce an electrolytic solution.

A cylindrical lithium secondary battery was produced by using the electrolytic solution thus obtained, and evaluated for the characteristics after continuous charging and the cycle characteristics. The results are shown in Table 1.

Comparative Example 3

2 parts by weight of vinylene carbonate and 1 part by weight of cyclohexylbenzene were added to 97 parts by weight of a mixture of ethylene carbonate, ethylmethyl carbonate, dimethyl carbonate and diethyl carbonate (volume ratio: 2/4/2/2), in which $LiPF_6$, which had been sufficiently dried, was dissolved to make a ratio of 1.0 mole/L, to produce an electrolytic solution.

A cylindrical lithium secondary battery was produced by using the electrolytic solution thus obtained, and evaluated for the characteristics after continuous charging and the cycle characteristics. The results are shown in Table 1.

The cylindrical battery suffered operation of the electric current breaker during the continuous charging test due to an increased inner pressure, and thus could not be discharged.

Example 5

1 part by weight of vinylene carbonate was added to 99 parts by weight of a mixture of ethylene carbonate, ethylmethyl carbonate, dimethyl carbonate and diethyl carbonate (volume ratio: 2/4/2/2), in which $LiPF_6$ and $LiBF_4$, which had been sufficiently dried, were dissolved to make ratios of 1.0 mole/L and 0.05 mole/L, respectively, to produce an electrolytic solution.

A cylindrical lithium secondary battery was produced by using the electrolytic solution thus obtained, and evaluated for the characteristics after continuous charging and the cycle characteristics. The results are shown in Table 1.

Example 6

0.5 part by weight of vinylene carbonate was added to 99.5 parts by weight of a mixture of ethylene carbonate, ethylmethyl carbonate, dimethyl carbonate and diethyl carbonate (volume ratio: 2/4/2/2), in which $LiPF_6$ and $LiBF_4$, which had been sufficiently dried, were dissolved to make ratios of 1.0 mole/L and 0.05 mole/L, respectively, to produce an electrolytic solution.

A cylindrical lithium secondary battery was produced by using the electrolytic solution thus obtained, and evaluated for the characteristics after continuous charging and the cycle characteristics. The results are shown in Table 1.

Comparative Example 4

1 part by weight of vinylene carbonate was added to 99 parts by weight of a mixture of ethylene carbonate, ethylmethyl carbonate, dimethyl carbonate and diethyl carbonate (volume ratio: 2/4/2/2), in which $LiPF_6$, which had been sufficiently dried, was dissolved to make a ratio of 1.0 mole/L, to produce an electrolytic solution.

A cylindrical lithium secondary battery was produced by using the electrolytic solution thus obtained, and evaluated for the characteristics after continuous charging and the cycle characteristics. The results are shown in Table 1.

The cylindrical battery suffered operation of the electric current breaker during the continuous charging test due to an increased inner pressure, and thus could not be discharged.

Comparative Example 5

0.5 part by weight of vinylene carbonate was added to 99.5 parts by weight of a mixture of ethylene carbonate, ethylmethyl carbonate, dimethyl carbonate and diethyl carbonate (volume ratio: 2/4/2/2), in which LiPF$_6$, which had been sufficiently dried, was dissolved to make a ratio of 1.0 mole/L, to produce an electrolytic solution.

A cylindrical lithium secondary battery was produced by using the electrolytic solution thus obtained, and evaluated for the characteristics after continuous charging and the cycle characteristics. The results are shown in Table 1.

The cylindrical battery suffered operation of the electric current breaker during the continuous charging test due to an increased inner pressure, and thus could not be discharged.

Comparative Example 6

0.1 part by weight of vinylene carbonate was added to 99.9 parts by weight of a mixture of ethylene carbonate, ethylmethyl carbonate, dimethyl carbonate and diethyl carbonate (volume ratio: 2/4/2/2), in which LiPF$_6$, which had been sufficiently dried, was dissolved to make a ratio of 1.0 mole/L, to produce an electrolytic solution.

A cylindrical lithium secondary battery was produced by using the electrolytic solution thus obtained, and evaluated for the characteristics after continuous charging and the cycle characteristics. The results are shown in Table 1.

In Table 1, comparison between Examples 1 to 3 and Comparative Examples 1 and 2 reveals that Examples 1 to 3 having LiBF$_4$ added thereto are excellent in continuous charging characteristics and cycle characteristics. In Comparative Example 2, gas generation is not suppressed since LiBF$_4$ is not added to exhibit deteriorated continuous charging characteristics although the cycle characteristics are improved by adding vinylene carbonate.

Comparison between Example 1 and Examples 2 and 3 reveals that Example 1 having both the symmetric linear carbonate and the asymmetric linear carbonate is excellent in continuous charging characteristics and cycle characteristics in comparison to Examples 2 and 3.

Comparison between Example 4 and Comparative Example 3 reveals that even in the case where cyclohexylbenzene is contained as an overcharge preventing agent, Example 4 having LiBF$_4$ added thereto is excellent in continuous charging characteristics and cycle characteristics.

Comparison between Examples 5 and 6 and Comparative Examples 4 to 6 reveals that even in the case where the concentration of vinylene carbonate is changed, Examples 5 and 6 having LiBF$_4$ added thereto are excellent in continuous charging characteristics and cycle characteristics.

TABLE 1

| | Concentration of lithium salts (mole/L) | | Kind of solvent | Remaining capacity after continuous charging test (%) | Discharge capacity after 100 cycles (%) |
| --- | --- | --- | --- | --- | --- |
| | LiPF$_6$ | LiBF$_4$ | | | |
| Example 1 | 1.0 | 0.05 | EC/EMC, DMC, DEC/VC | 97 | 85 |
| Example 2 | 1.0 | 0.05 | EC/EMC/VC | 95 | 83 |
| Example 3 | 1.0 | 0.05 | EC/DEC/VC | 91 | 81 |
| Comparative Example 1 | 1.0 | — | EC/EMC, DMC, DEC | 82 | 77 |
| Comparative Example 2 | 1.0 | — | EC/EMC, DMC, DEC/VC | breaker operated | 82 |
| Example 4 | 1.0 | 0.05 | EC/EMC, DMC, DEC/VC | 93 | 85 |
| Comparative Example 3 | 1.0 | — | EC/EMC, DMC, DEC/VC | breaker operated | 81 |
| Example 5 | 1.0 | 0.05 | EC/EMC, DMC, DEC/VC | 97 | 84 |
| Example 6 | 1.0 | 0.05 | EC/EMC, DMC, DEC/VC | 95 | 81 |
| Comparative Example 4 | 1.0 | — | EC/EMC, DMC, DEC/VC | breaker operated | 81 |
| Comparative Example 5 | 1.0 | — | EC/EMC, DMC, DEC/VC | breaker operated | 80 |
| Comparative Example 6 | 1.0 | — | EC/EMC, DMC, DEC/VC | 83 | 78 |

In Table,
EC denotes ethylene carbonate,
EMC denotes ethylmethyl carbonate,
DMC denotes dimethyl carbonate,
DEC denotes diethyl carbonate, and
VC denotes vinylene carbonate.

[Production of Sheet Lithium Secondary Battery]

The positive electrode (1), the negative electrode (1) and a polyethylene separator were accumulated in the order of the negative electrode, the separator, the positive electrode, the separator, and the negative electrode, to produce a unit battery, and the unit battery was housed in a bag formed with a laminated film of aluminum (thickness: 40 μm) coated on both surfaces thereof with resin layers in such a manner that terminals of the positive electrode and the negative electrode were came outside. Subsequently, an electrolytic solution described later was charged thereto, followed by vacuum-sealed, to produce a sheet battery.

[Evaluation of Capacity of Sheet Battery]

The sheet battery held between glass plates to improve contact between the electrode was charged with a constant electric current corresponding to 0.2 C until 4.2 V, and then discharged with a constant electric current corresponding to 0.2 C until 3 V. The operation was repeated three cycles to stabilize the battery, and in the fourth cycle, the battery was charged with a constant electric current of 0.5 C until 4.2 V and further charged with a constant voltage of 4.2 V until the electric current value reached 0.05 C, followed by discharging with a constant electric current of 0.2 C until 3 V, to obtain an initial discharge capacity.

[Evaluation of Continuous Charging Characteristics]

(1) Gas Generation Amount

The battery after completing the evaluation of capacity was charged at 60° C. with a constant electric current of 0.5 C until 4.25 V, and then further continuously charged with a constant voltage for 1 week.

After cooling the battery, the battery was immersed in an ethanol bath to measure the volume, and the gas generation amount was obtained from the change in volume before and after continuous charging.

(2) Remaining Capacity After Continuous Charging

After measuring the gas generation amount, the battery was discharged at 25° C. with a constant electric current of 0.2 C until 3 V to measure the remaining capacity after the continuous charging test, and the remaining capacity after continuous charging was obtained with the discharge capacity before the continuous charging test being 100.

Example 7 AND Comparative Examples 7 TO 10

1 part by weight of vinylene carbonate was added to 99 parts by weight of a mixture of ethylene carbonate, ethylmethyl carbonate and dimethyl carbonate (volume ratio: 3/5/2), in which $LiPF_6$ and lithium cyclic 1,3-perfluoropropanedisulfonylimide, which had been sufficiently dried, were dissolved to make ratios shown in Table 2 below, to produce electrolytic solutions.

A sheet batterys were produced by using the electrolytic solutions thus obtained, and evaluated for the continuous charging characteristics. The results are shown in Table 2.

It is understood from Table 2 that the battery containing the lithium salt represented by the formula (1) in the particular proportion is excellent in gas generation and continuous charging characteristics.

TABLE 2

| | Concentration of lithium salts | | Gas generation amount (mL) | Remaining capacity (%) |
|---|---|---|---|---|
| | $LiPF_6$ | Formula (1) | | |
| Example 7 | 0.8 | 0.2 | 0.24 | 75 |
| Comparative Example 7 | 1 | — | 0.57 | 75 |
| Comparative Example 8 | 0.5 | 0.5 | 0.44 | 74 |
| Comparative Example 9 | 0.2 | 0.8 | 0.58 | 68 |
| Comparative Example 10 | — | 1 | 1.01 | 0 |

In Table, Formula (1) denotes lithium cyclic 1,3-perfluoropropanedisulfonylimide.

The invention has been described in detail with reference to specific embodiments, but it is apparent to a skilled person in the art that various changes and modifications can be made therein without departing from the spirit and the scope of the invention.

The present application is based on Japanese Patent Application filed on Feb. 27, 2003 (Patent Application No. 2003-51684, Japanese Patent Application filed on May 13, 2003 (Patent Application No. 2003-134694), and Japanese Patent Application filed on Jun. 19, 2003 (Patent Application No. 2003-174756), the entire disclosures of which are incorporated herein by reference.

INDUSTRIAL APPLICABILITY

According to the invention, such a battery can be produced that has a high capacity, is excellent in storage characteristics, cycle characteristics and continuous charging characteristics, and is small in gas generation amount, whereby size reduction and improvement in performance of a lithium secondary battery can be attained.

The invention claimed is:

1. A nonaqueous electrolytic solution comprising a lithium salt and a nonaqueous solvent dissolving the same, wherein the electrolytic solution contains, as the lithium salt, $LiPF_6$ in a concentration of from 0.2 to 2 mole/L, and $LiBF_4$ and/or a compound represented by the following formula (1) in a molar ratio of from 0.005 to 0.4 with respect to $LiPF_6$, and the nonaqueous solvent mainly comprises:
(1) ethylene carbonate and/or propylene carbonate,
(2-1) a symmetric linear carbonate,
(2-2) an asymmetric linear carbonate, and
(3) vinylene carbonate:

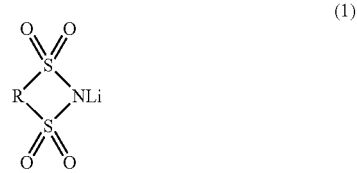

(In the formula, R represents a linear or branched alkylene group having from 1 to 20 carbon atoms, which may be substituted by a fluorine atom, provided that the alkylene chain except for a side chain has 12 or less carbon atoms).

2. The nonaqueous electrolytic solution according to claim 1, wherein the electrolytic solution contains $LiBF_4$ and/or a compound represented by the following formula (1) in a concentration of from 0.001 to 0.3 mole/L.

3. The nonaqueous electrolytic solution according to claim 1, wherein a total amount of ethylene carbonate, propylene carbonate, the symmetric linear carbonate, the asymmetric linear carbonate and vinylene carbonate in the nonaqueous electrolytic solution except for the lithium salt is 80% by weight or more.

4. The nonaqueous electrolytic solution according to claim 1, wherein a proportion of vinylene carbonate in the nonaqueous electrolytic solution except for the lithium salt is from 0.01 to 8% by weight.

5. The nonaqueous electrolytic solution according to claim 1, wherein the symmetric carbonate is selected from dimethyl carbonate and diethyl carbonate, and the asymmetric carbonate is selected from ethylmethyl carbonate.

6. The nonaqueous electrolytic solution according to claim 1, wherein a volume ratio of a total amount of ethylene carbonate (1) and a total amount of the symmetric linear carbonate (2-1) and the asymmetric linear carbonate (2-2) is from 10/90 to 70/30.

7. The nonaqueous electrolytic solution according to claim 1, wherein the nonaqueous solvent further comprises an aromatic compound selected from biphenyl, an alkylbiphenyl, terphenyl, a partially hydrogenated product of terphenyl, cyclohexylbenzene, t-butylbenzene, t-amylbenzene, diphenyl ether and dibenzofuran.

8. The nonaqueous electrolytic solution according to claim 1, wherein the electrolytic solution further comprises, as the lithium salt, one selected from $LiN(CF_3SO_2)_2$, $LiN(C_2F_5SO_2)_2$ and $LiCF_3SO_3$ in a concentration of from 0.001 to 0.2 mole/L.

9. A lithium secondary battery characterized by comprising a negative electrode and a positive electrode capable of occluding and releasing lithium, and the nonaqueous electrolytic solution according to claim 1.

10. The lithium secondary battery according to claim 9, wherein the positive electrode contains, as an active substance, a lithium-transition metal complex oxide selected from a lithium-cobalt oxide, a lithium-nickel oxide and a lithium-manganese oxide, or a complex oxide obtained by substituting a part of the transition metal of the complex oxide by another metal.

11. A nonaqueous electrolytic solution comprising a lithium salt and a nonaqueous solvent dissolving the same, wherein the electrolytic solution contains, as the lithium salt, $LiPF_6$ in a concentration of from 0.2 to 2 mole/L and $LiBF_4$ in a concentration of from 0.001 to 0.3 mole/L, and
the nonaqueous solvent mainly comprises:
(1) ethylene carbonate and/or propylene carbonate,
(2-1) a symmetric linear carbonate,
(2-2) an asymmetric linear carbonate, and
(3) vinylene carbonate.

12. The nonaqueous electrolytic solution according to claim 11, wherein $LiBF_4$ is contained in a molar ratio of from 0.005 to 0.4 with respect to $LiPF_6$.

13. A nonaqueous electrolytic solution comprising a lithium salt and a nonaqueous solvent dissolving the same, wherein the electrolytic solution contains, as the lithium salt, $LiPF_6$ in a concentration of from 0.5 to 2.5 mole/L and a lithium salt represented by the following formula (1) in a concentration of from 0.001 to 0.3 mole/L:

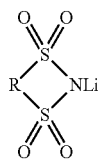

(1)

(In the formula, R represents a linear or branched alkylene group having from 1 to 20 carbon atoms, which may be substituted by a fluorine atom, provided that the alkylene chain except for a side chain has 12 or less carbon atoms).

14. The nonaqueous electrolytic solution according to claim 13, wherein the nonaqueous solvent mainly comprises:
(1) ethylene carbonate and/or propylene carbonate,
(2-1) a symmetric linear carbonate,
(2-2) an asymmetric linear carbonate, and
(3) vinylene carbonate.

15. A lithium secondary battery comprising a negative electrode and a positive electrode capable of occluding and releasing lithium, and a nonaqueous electrolytic solution, wherein the negative electrode contains, as an active substance, a carbonaceous substance, the nonaqueous electrolytic solution mainly comprises a lithium salt and a nonaqueous solvent dissolving the same and contains, as the lithium salt, $LiPF_6$ in a concentration of from 0.2 to 2 mole/L, and $LiBF_4$ and/or a lithium salt represented by the following formula (1) in a molar ratio of from 0.005 to 0.4 with respect to $LiPF_6$, and
the nonaqueous solvent mainly comprises:
(1) ethylene carbonate and/or propylene carbonate,
(2) a linear carbonate, and
(3) vinylene carbonate:

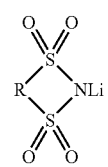

(1)

(In the formula, R represents a linear or branched alkylene group having from 1 to 20 carbon atoms, which may be substituted by a fluorine atom, provided that the alkylene chain except for a side chain has 12 or less carbon atoms).

16. A nonaqueous electrolytic solution for a lithium secondary battery, comprising a negative electrode containing a carbonaceous substance as an active substance capable of occluding and releasing lithium, a positive electrode containing an active substance capable of occluding and releasing lithium, and a nonaqueous electrolytic solution mainly comprising a lithium salt and a nonaqueous solvent dissolving the same,
wherein the nonaqueous electrolytic solution contains, as the lithium salt, $LiPF_6$ in a concentration of from 0.2 to 2 mole/L, and $LiBF_4$ and/or a lithium salt represented by the following formula (1) in a molar ratio of from 0.005 to 0.4 with respect to $LiPF_6$, and
the nonaqueous solvent mainly comprises:
(1) ethylene carbonate and/or propylene carbonate,
(2) a linear carbonate, and
(3) vinylene carbonate:

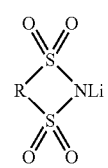

(1)

(In the formula, R represents a linear or branched alkylene group having from 1 to 20 carbon atoms, which may be substituted by a fluorine atom, provided that the alkylene chain except for a side chain has 12 or less carbon atoms).

* * * * *